(12) United States Patent
Riopel (10) Patent No.: US 7,175,033 B1
(45) Date of Patent: Feb. 13, 2007

(54) PORTABLE CHAFING STAND SYSTEM

(76) Inventor: Jerald J. Riopel, 24631 St. Benedict Rd., Jordan, MN (US) 55352

( * ) Notice: Subject to any disclaimer, the term of this patent is extended or adjusted under 35 U.S.C. 154(b) by 0 days.

(21) Appl. No.: 10/902,718

(22) Filed: Jul. 29, 2004

(51) Int. Cl.
*A47F 3/14* (2006.01)

(52) U.S. Cl. ..................... 211/132.1; 211/72

(58) Field of Classification Search ............ 211/132.1, 211/130.1, 126.6, 72, 133.6, 195, 149; 220/690, 220/682, 4.31, 4.28; 99/449
See application file for complete search history.

(56) References Cited

U.S. PATENT DOCUMENTS

| | | | | |
|---|---|---|---|---|
| 497,205 | A * | 5/1893 | Pia ............................. | 220/682 |
| 1,923,881 | A * | 8/1933 | Palais ..................... | 229/122.21 |
| 2,530,849 | A * | 11/1950 | Wyatt et al. .............. | 220/4.28 |
| 2,615,589 | A * | 10/1952 | Perdue ..................... | 217/12 R |
| 3,109,420 | A * | 11/1963 | Ott et al. ................... | 126/9 R |
| 3,379,315 | A * | 4/1968 | Broadwin ................... | 211/72 |
| 3,828,966 | A | 8/1974 | Martin ......................... | 220/7 |
| 4,126,116 | A | 11/1978 | McCallum .................... | 126/9 |
| 4,646,927 | A * | 3/1987 | Williams et al. ........... | 217/12 R |
| 4,807,802 | A * | 2/1989 | Williams ................... | 220/4.28 |
| 4,867,327 | A * | 9/1989 | Roland ..................... | 217/12 R |
| 5,119,799 | A | 6/1992 | Cowan ........................ | 126/9 |
| 5,517,903 | A | 5/1996 | Kaufman .................... | 99/449 |
| 5,711,210 | A | 1/1998 | Kaufman .................... | 99/340 |
| 5,992,406 | A | 11/1999 | Lelle ........................... | 126/33 |
| 6,035,768 | A | 3/2000 | Kaufman .................... | 99/449 |
| 6,170,677 | B1 * | 1/2001 | Meltser ....................... | 211/55 |
| 6,454,124 | B1 * | 9/2002 | Edwards et al. ............ | 220/636 |

FOREIGN PATENT DOCUMENTS

| WO | WO97/37574 | 10/1997 |
|---|---|---|
| WO | WO97/42865 | 11/1997 |

OTHER PUBLICATIONS

Compact Chafing Dishes ChaferDepot Website printout Feb. 29, 2004, 5 Pages.
Chafing Dishes ChaferDepot Website printout Feb. 29, 2004 2 Pages.

* cited by examiner

Primary Examiner—Jennifer E. Novosad (57) ABSTRACT

A portable chafing stand system for providing a chafing stand that is portable and that reduces fuel consumption. The portable chafing stand system includes a pair of end members and a pair of side members attachable to one another. The end members each have a plurality of first slots and a plurality of second slots. The side members each have a plurality of catch members that are catchably received within the first slots and the second slots. The side members preferably have a lower lip for supporting the fuel unit. The end members each include a pair of upper supports for supporting an upper lip of a disposable food tray. The upper edge of the side members supports the floor of the disposable food tray.

19 Claims, 12 Drawing Sheets

PORTABLE CHAFING STAND SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to chafing stands and more specifically it relates to a portable chafing stand system for providing a chafing stand that is portable and that reduces fuel consumption.

2. Description of the Related Art

Conventional chafing stands have been in use for years. Conventional chafing stands are typically comprised of a rigid frame structure that supports a water pan capable of storing a volume of water and receiving a food pan. Conventional chafing stands may also include a fuel holder that holds a fuel unit, wherein the fuel unit is typically comprised of a fuel gel can or a candle structure. The fuel unit is lighted below the water pan and is generally exposed. The flame from the fuel unit heats the water pan filled with a level of water and a food pan is then positioned within the water pan in order to remain heated.

One of the main problems with conventional chafing stands is that they are a solid structure and are not efficient when having to transport to various locations. A further problem with conventional chafing stands is that they do not form into a compact storage structure and thereby require a significant amount of space when transporting. Another problem with conventional chafing stands is that the exposed flame is susceptible to being negatively affected by wind and other air movements. Another problem with conventional chafing stands is that the exposed area beneath the water pan allows a significant amount of heat to escape without being transferred to the food pan.

While these devices may be suitable for the particular purpose to which they address, they are not as suitable for providing a chafing stand that is portable and that reduces fuel consumption. Conventional chafing stands are not suitable for storage and transportation in a compact storage position.

In these respects, the portable chafing stand system according to the present invention substantially departs from the conventional concepts and designs of the prior art, and in so doing provides an apparatus primarily developed for the purpose of providing a chafing stand that is portable and that reduces fuel consumption.

BRIEF SUMMARY OF THE INVENTION

In view of the foregoing disadvantages inherent in the known types of chafing stands now present in the prior art, the present invention provides a new portable chafing stand system construction wherein the same can be utilized for providing a chafing stand that is portable and that reduces fuel consumption.

The general purpose of the present invention, which will be described subsequently in greater detail, is to provide a new portable chafing stand system that has many of the advantages of the chafing stands mentioned heretofore and many novel features that result in a new portable chafing stand system which is not anticipated, rendered obvious, suggested, or even implied by any of the prior art chafing stands, either alone or in any combination thereof.

To attain this, the present invention generally comprises a pair of end members and a pair of side members attachable to one another. The end members each have a plurality of first slots and a plurality of second slots. The side members each have a plurality of catch members that are catchably received within the first slots and the second slots. The side members preferably have a lower lip for supporting the fuel unit. The end members each include a pair of upper supports for supporting an upper lip of a disposable food tray. The upper edge of the side members supports the floor of the disposable food tray.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a portable chafing stand system that will overcome the shortcomings of the prior art devices.

A second object is to provide a portable chafing stand system for providing a chafing stand that is portable and that reduces fuel consumption.

Another object is to provide a portable chafing stand system that is capable of supporting disposable food trays.

An additional object is to provide a portable chafing stand system that may be easily disassembled into a compact storage position.

A further object is to provide a portable chafing stand system that is easily assembled.

Another object is to provide a portable chafing stand system that protects the fuel unit against air movements and wind.

A further object is to provide a portable chafing stand system that eliminates the need for steel chafing pans.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 12 illustrate a portable chafing stand system 10, which comprises a pair of end members 20 and a pair of side members 40 attachable to one another. The end members 20 each have a plurality of first slots 22 and a plurality of second slots 24. The side members 40 each have a plurality of catch members 44 that are catchably received within the first slots 22 and the second slots 24. The side members 40 preferably have a lower lip 42 for supporting the fuel unit 16. The end members 20 each include a pair of upper supports 26 for supporting an upper lip 14 of a disposable food tray 12. The upper edge of the side members 40 supports the floor of the disposable food tray 12.

B. End Members

Figure 3:
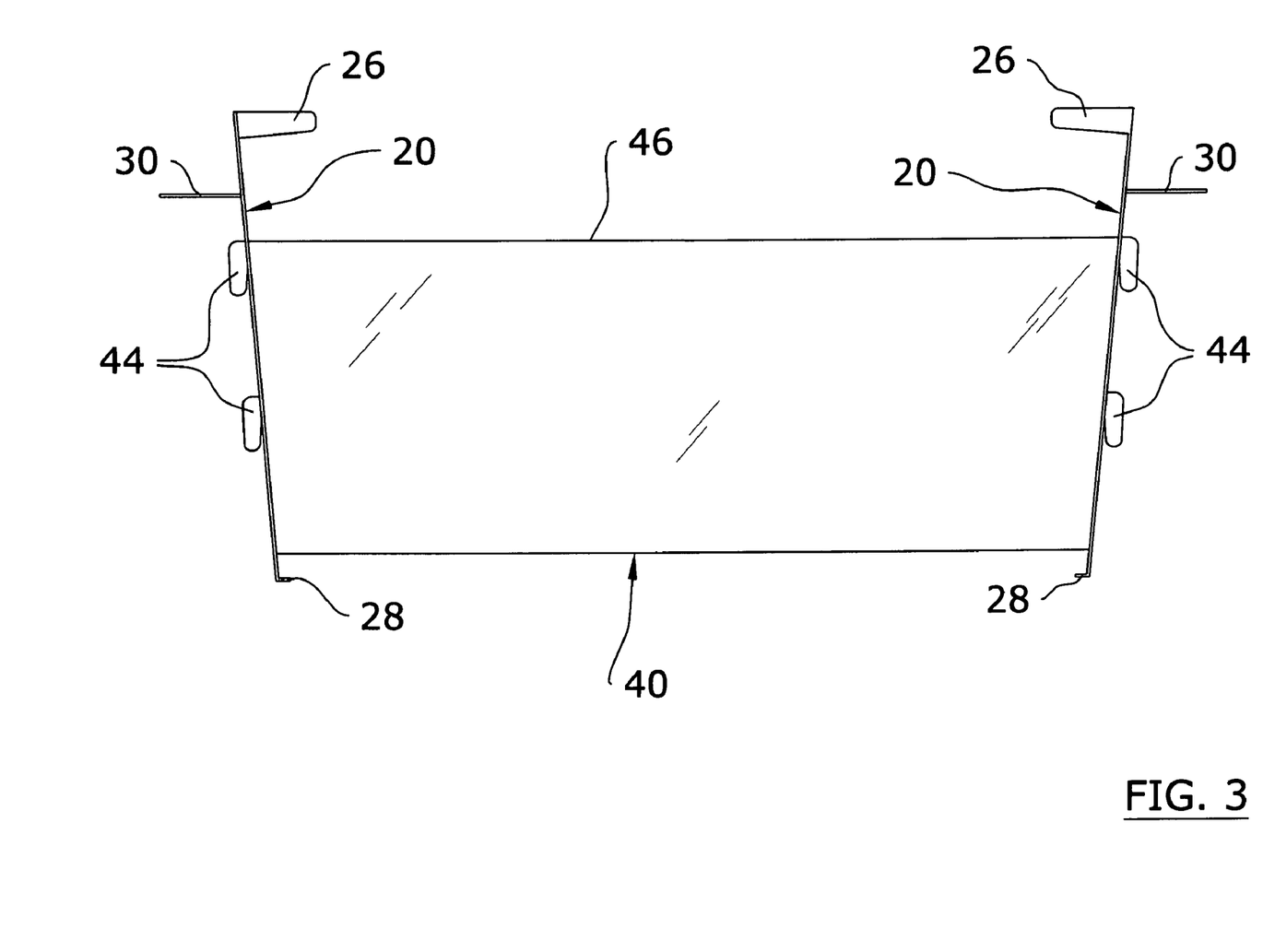
FIG. 3 is a side view of the present invention.
Figure 4:
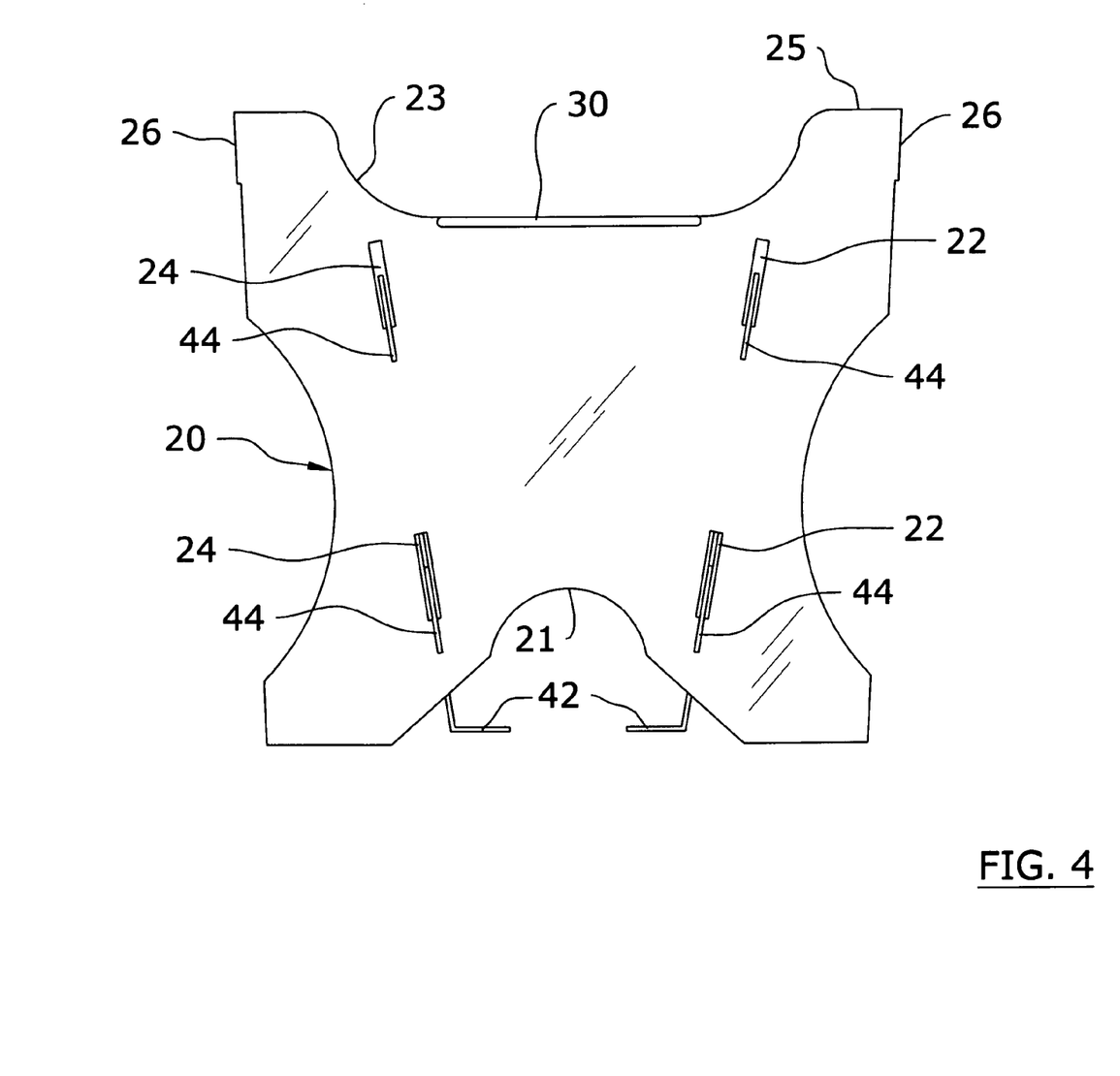
FIG. 4 is an end view of the present invention.
Figure 5:
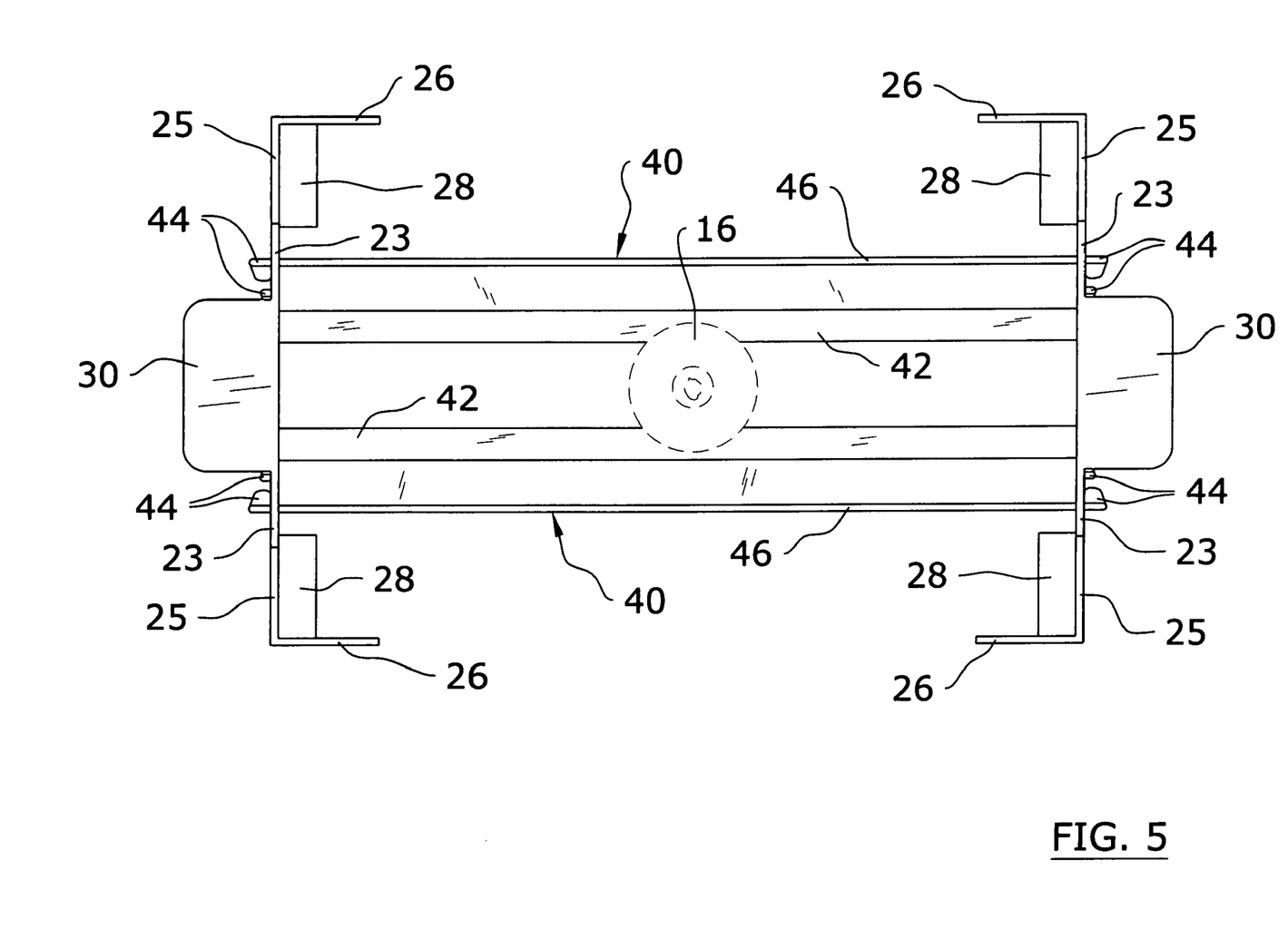
FIG. 5 is a top view of the present invention.
Figure 6:
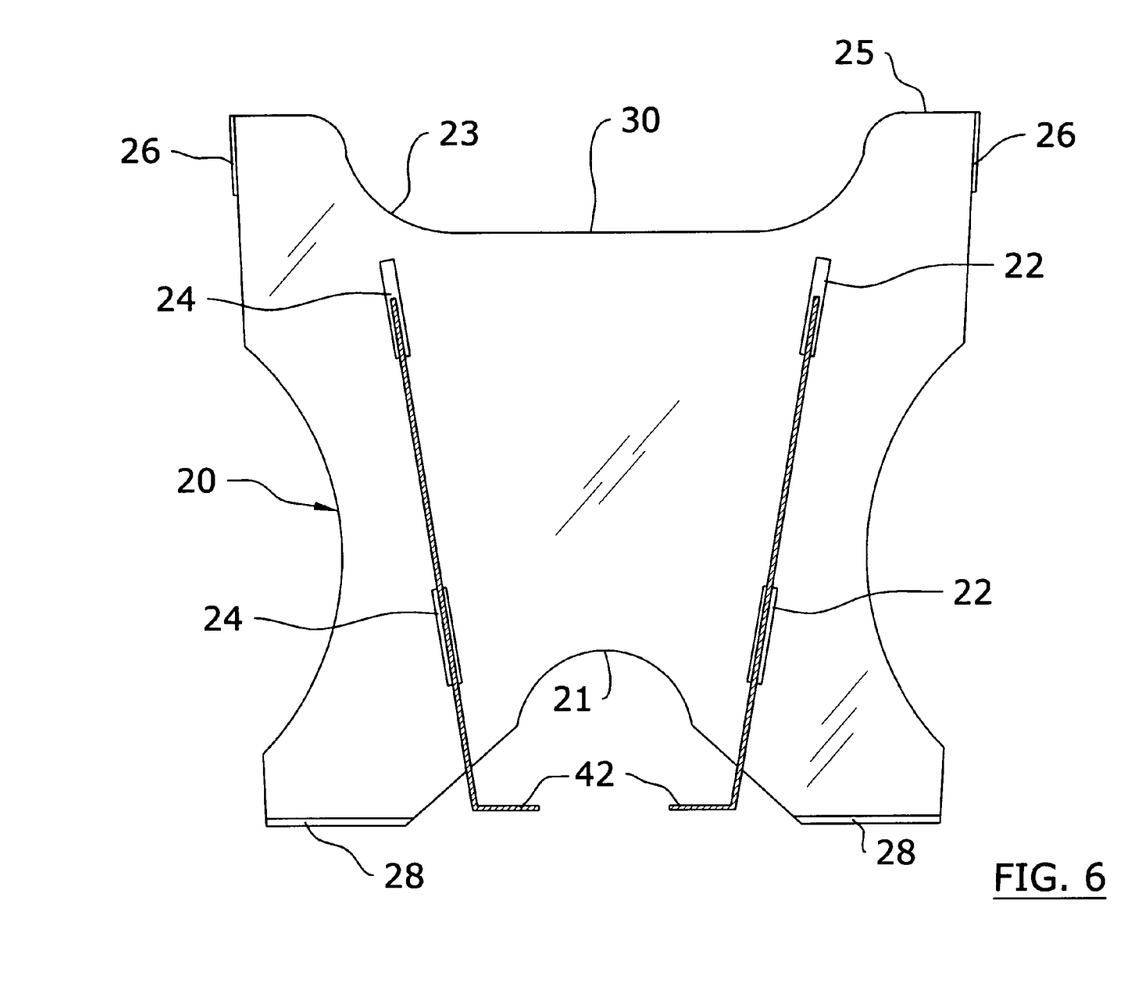
FIG. 6 is a cross sectional view taken along line 6—6 of FIG. 1.

The pair of end members 20 each preferably has a substantially flat and straight structure which assists in providing compact storage of the present invention when disassembled. The end members 20 are formed for supporting the side members 40 as best illustrated in FIGS. 1 and 3 of the drawings.

Figure 11:
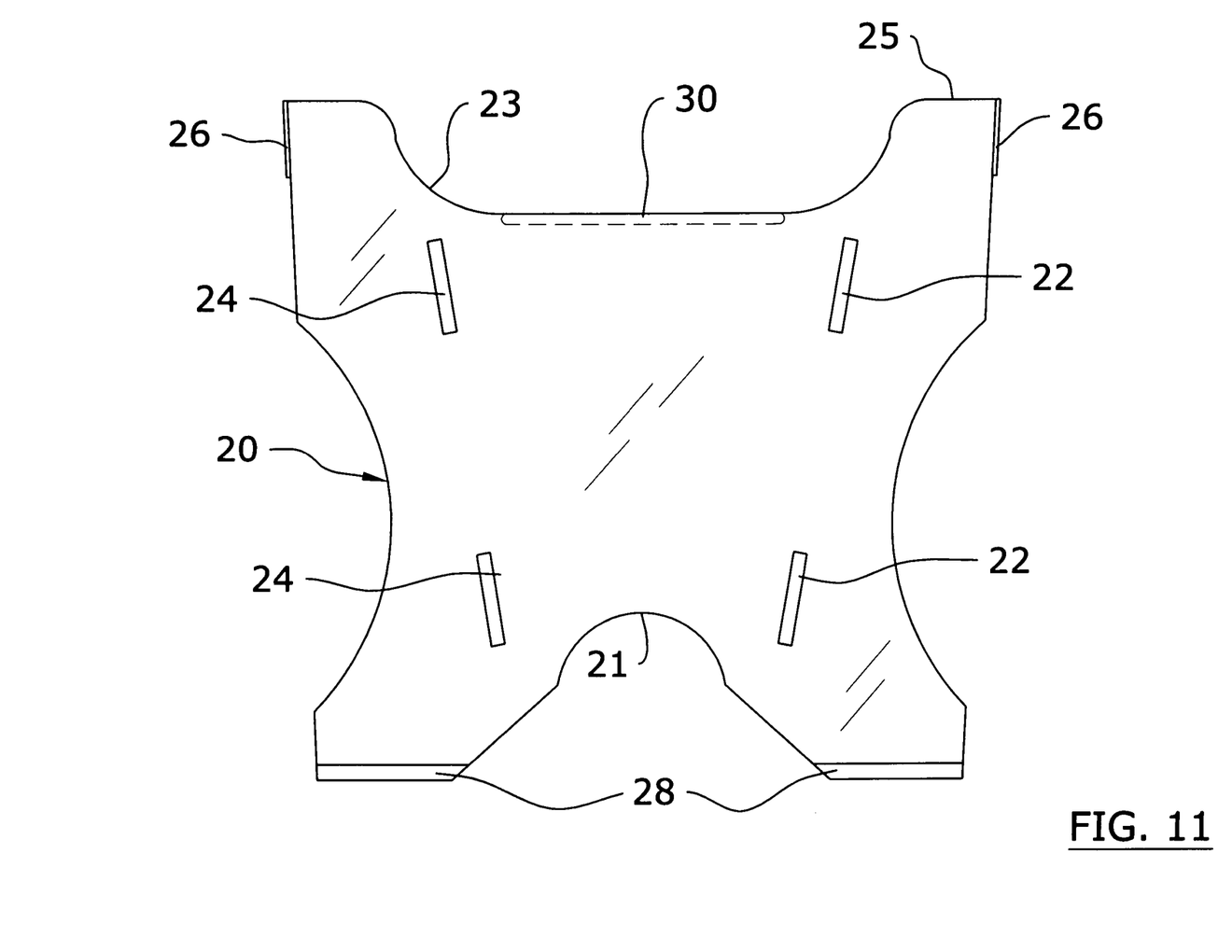
FIG. 11 is a front view of the end member.

The pair of end members 20 each preferably has a plurality of first slots 22 and a plurality of second slots 24 as best illustrated in FIG. 11 of the drawings. The first slots 22 and the second slots 24 are preferably angled downwardly and inwardly as further illustrated in FIG. 11 of the drawings. The first slots 22 are preferably aligned with one another and the second slots 24 are preferably aligned with one another, however staggered and random patterns may be utilized.

Figure 1:
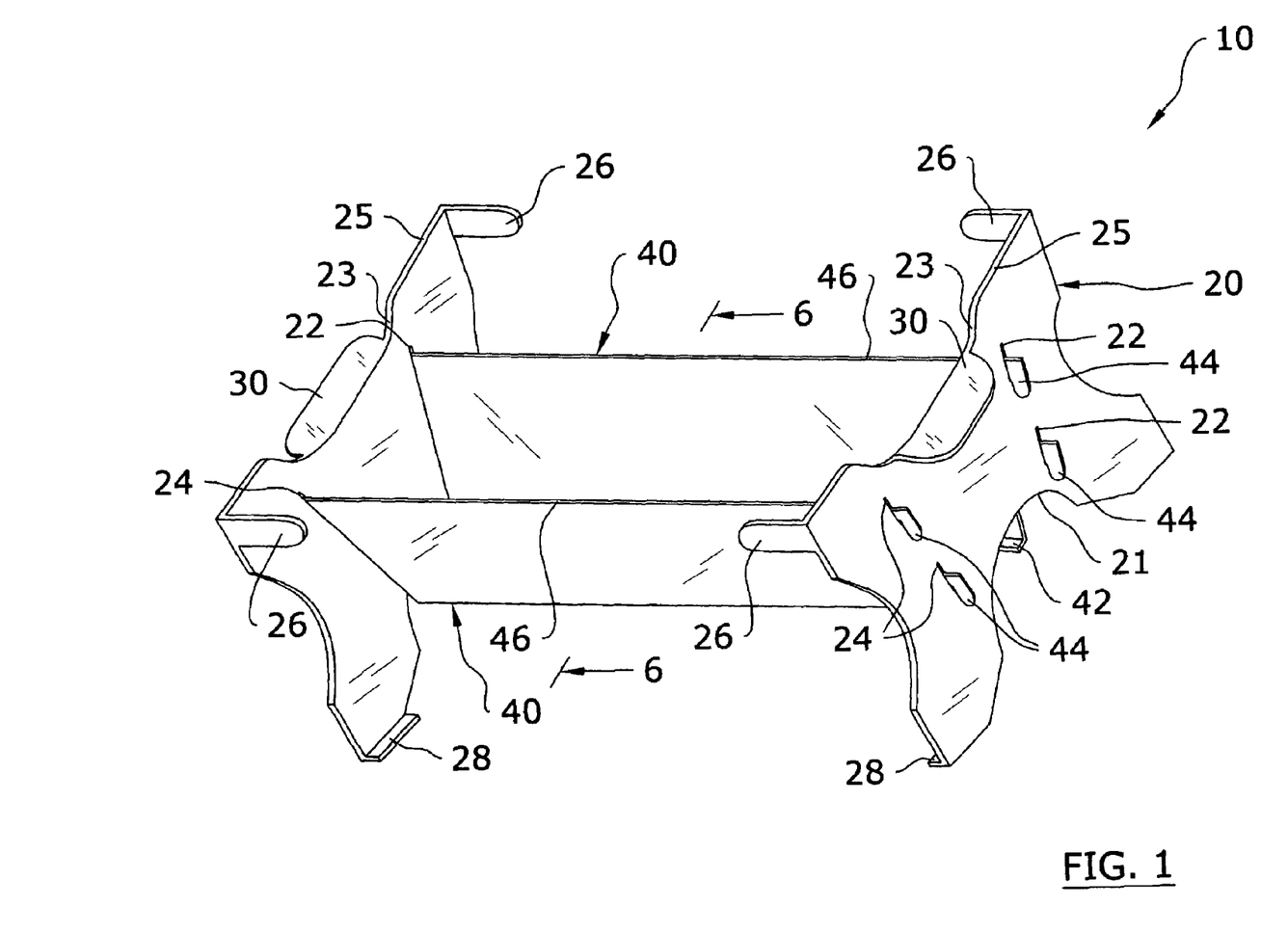
FIG. 1 is an upper perspective view of the present invention fully assembled.
Figure 9:
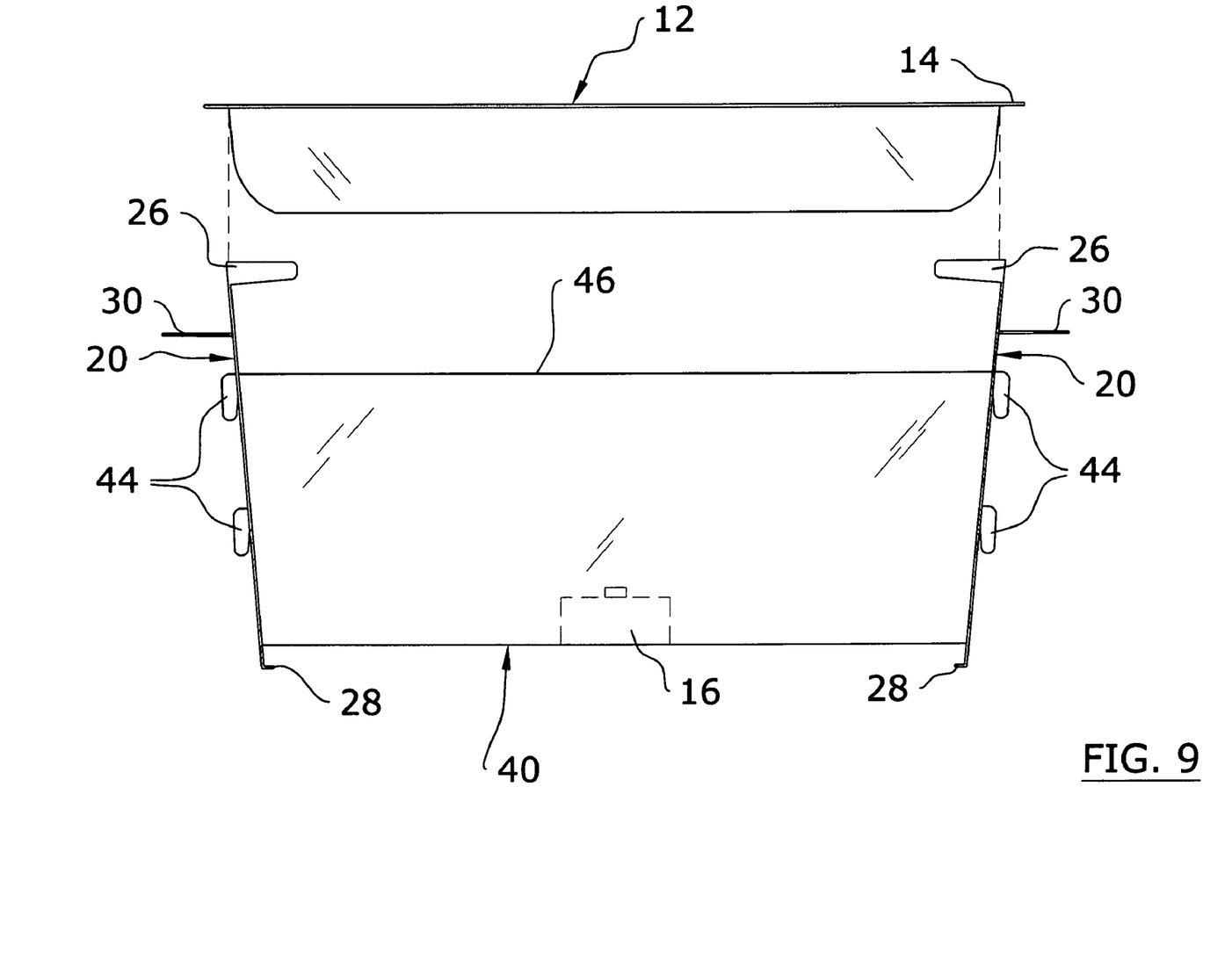
FIG. 9 is a side view with a food tray positioned above the present invention.
Figure 10:
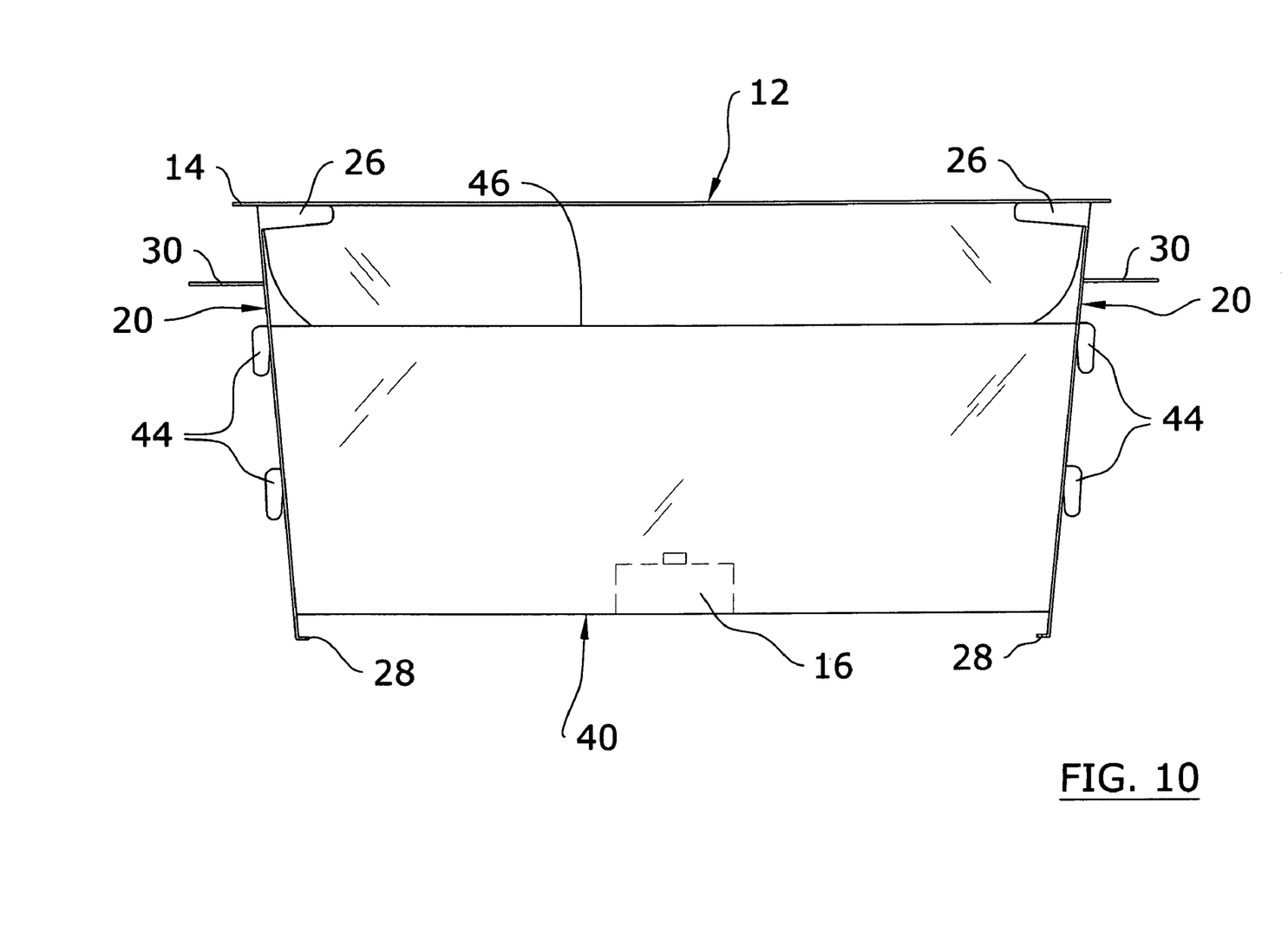
FIG. 10 is a side view with a food tray positioned within the present invention.

The end members 20 each preferably include at least one handle 30 as shown in FIGS. 1, 9 and 10 of the drawings. The handles 30 allow for the user to grasp and lift the present invention while simultaneously supporting a disposable food tray 12. The end members 20 each preferably include an upper cutout 23 above the handle 30 which provides access to grasping the ends of the food tray 12. The end members 20 each preferably include a lower cutout 21 which provides access to the interior portion and the fuel unit 16 (e.g. to light the fuel unit 16).

Figure 2:
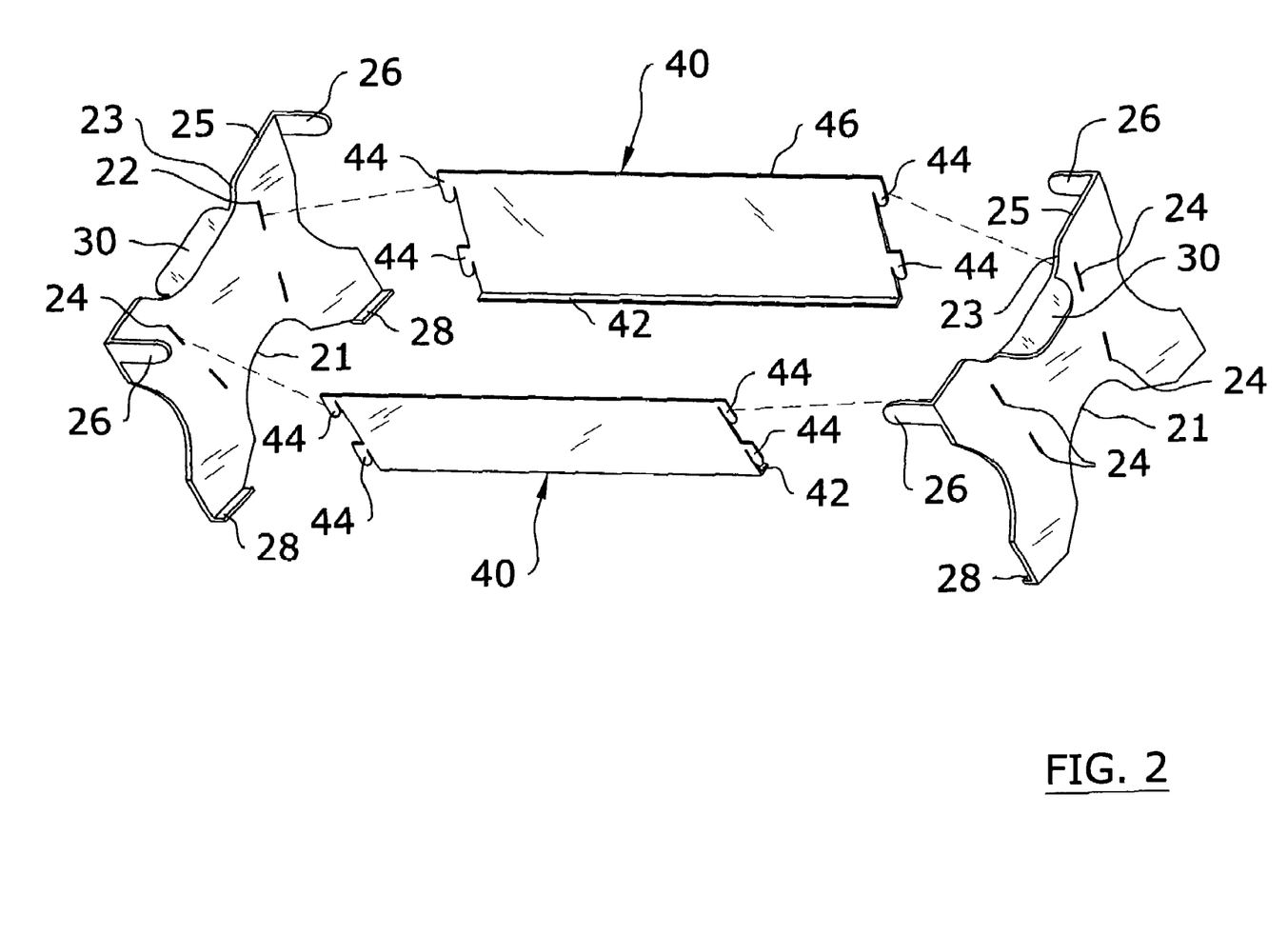
FIG. 2 is an exploded upper perspective view of the present invention.
Figure 8:
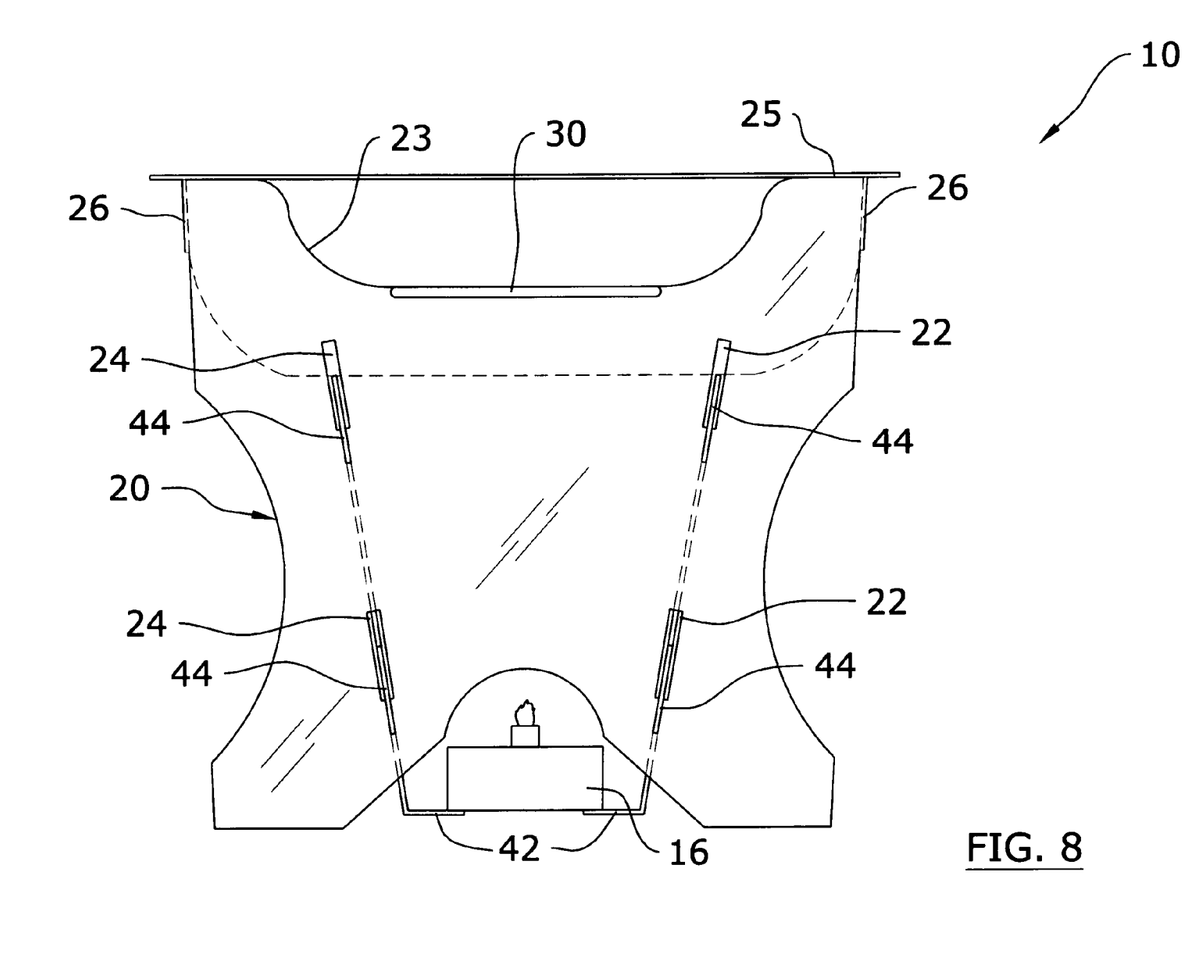
FIG. 8 is an end view with a food tray positioned within the present invention.

The end members 20 each preferably include an upper end edge 25 that is capable of supporting an upper lip 14 of a food tray 12 as shown in FIG. 1 of the drawings. The end members 20 each preferably include a plurality of upper supports 26 extending substantially transversely there from as best illustrated in FIGS. 1, 2 and 9 of the drawings. The end members 20 and the upper supports 26 for each preferably include an upper end edge 25 that is capable of supporting an upper lip 14 of a food tray 12 as shown in FIGS. 8 and 10 of the drawings.

The end members 20 each may include at least one foot member 28 for assisting in the supporting of the end members 20 upon a surface. The foot member 28 may be comprised of various structures such as but not limited to a flange structure.

C. Side Members

The pair of side members 40 each preferably has a substantially flat and straight structure which assists in providing compact storage of the present invention when disassembled. The side members 40 are formed for being catchably and removably received within the end members 20 as best illustrated in FIGS. 1 and 3 of the drawings.

Figure 12:
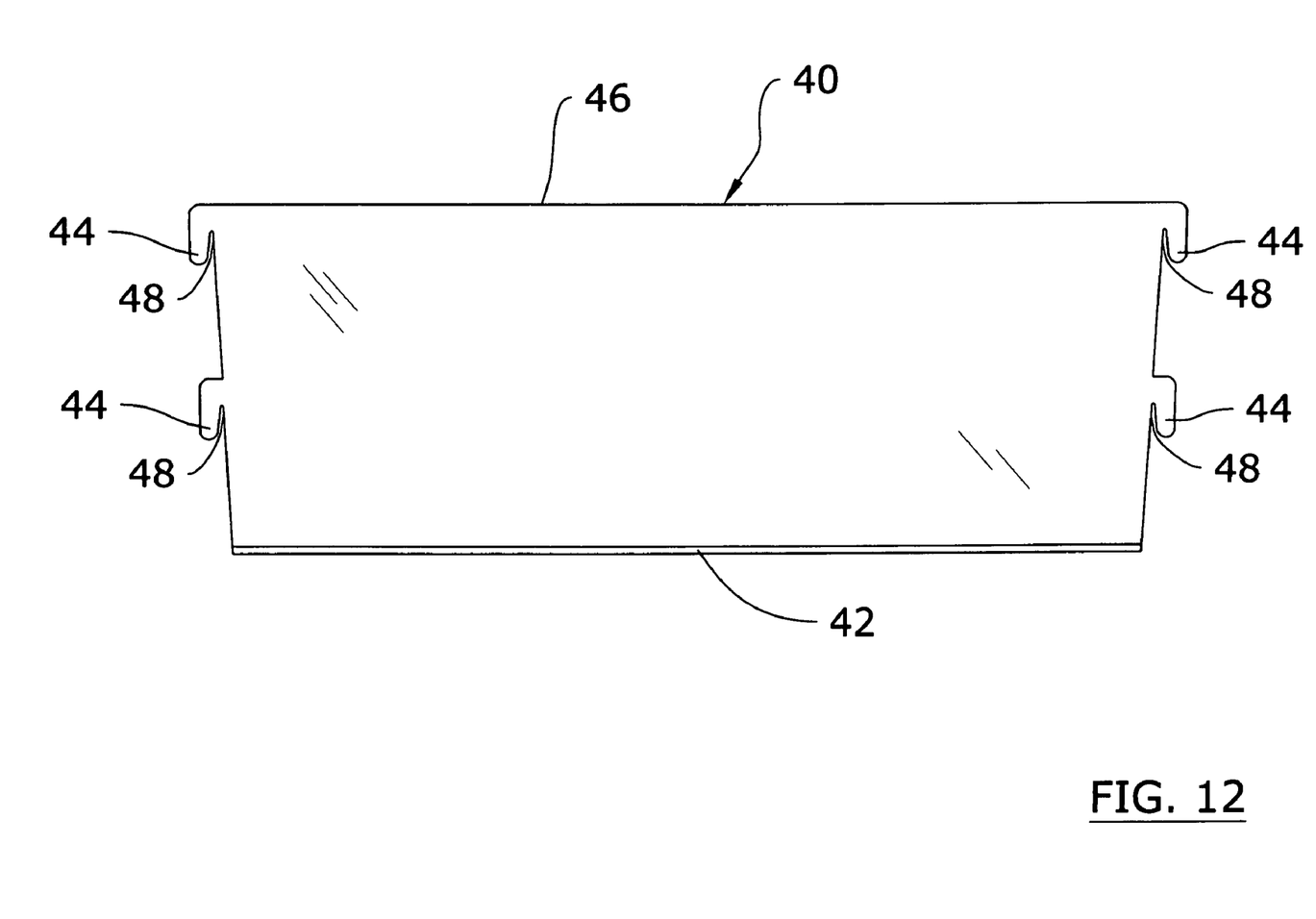
FIG. 12 is a front view of the side member.

The pair of side members 40 each preferably has a plurality of catch members 44 extending from opposing ends of the side members 40 as best illustrated in FIG. 12 of the drawings. The catch members 44 are catchably received within the first slots 22 and the second slots 24 of the respective end members 20. The catch members 44 each have a downwardly extending portion defining a receiving slot 48 as best illustrated in FIG. 12 of the drawings. The receiving slot 48 of each of the catch members 44 receives a portion of the corresponding end member 20 as illustrated in FIGS. 3, 9 and 10 of the drawings.

Figure 7:
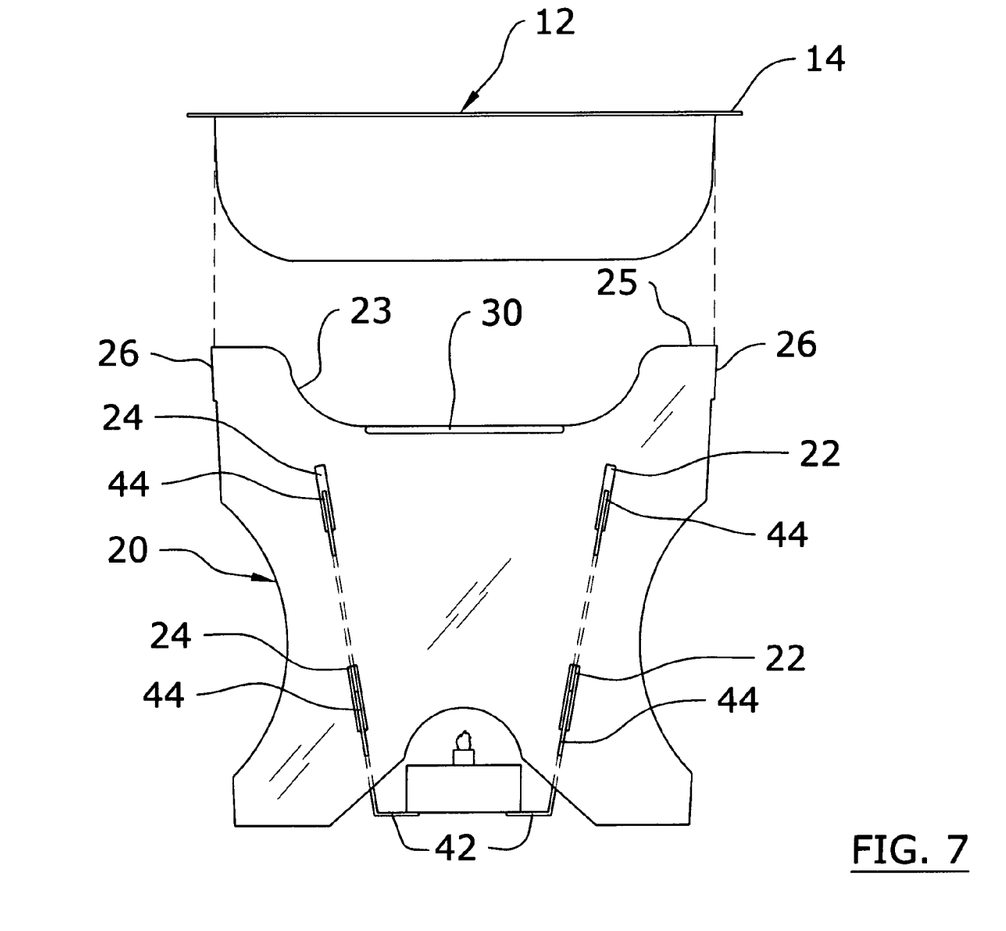
FIG. 7 is an end view with a food tray positioned above the present invention.

The side members 40 each preferably include a lower lip 42 extending inwardly at an angle for selectively supporting a fuel unit 16 as shown in FIGS. 4, 7, 8 and 12 of the drawings. The lower lip 42 of each the side members 40 form a slot between thereof when the present invention is fully assembled as shown in FIGS. 7 and 8 of the drawings. The side members 40 each include an upper side edge 46 for supporting a floor of a food tray 12 as shown in FIGS. 8 and 10 of the drawings.

D. Operation of Invention

To assemble the present invention, it can be appreciated that there are various different steps and processes that the present invention may be assembled. For example, the user may first attached to pair of side members 40 to a first end member 20 by inserting the catch members 44 into the first slots 22 and the second slots 24 of the first end member 20. The user then would attached the second end member 20 to the opposing end of the side members 40 with the catch members 44 inserted into the first slots 22 and the second slots 24 of the second end member 20. Alternatively, the user may attach the end members 20 to a first side member 40 within the first slots 22 of each and then attached the second side member 40 within the second slots 24 of each.

After the present invention is fully assembled as shown in FIG. 1 of the drawings, the user then positions the fuel unit 16 upon the lower lips 42 of the side members 40 as shown in FIGS. 7 and 8 of the drawings. The user then positions the food tray 12 above the assembled present invention as shown in FIGS. 7 and 9 of the drawings. The user then lowers the food tray 12 into the present invention with the upper lip 14 positioned upon the upper end edge 25 of the end members 20 and the floor positioned upon the upper side edges 46 of the side members 40 as shown in FIGS. 8 and 10 of the drawings. The fuel unit 16 may be lighted before or after the food tray 12 is positioned within the assembled invention. The heat of the fuel unit 16 maintains the temperature of the food tray 12 while the side members 40 and the end members 20 protect the fuel unit 16 from air movements, wind and other elements.

After the user is finished utilizing the present invention, the user removes the food tray 12 and disposes of the food tray 12. The fuel unit 16 is then extinguished and removed from the lower lips 42 for later usage. The end members 20 and the side members 40 are then disassembled. The disassembled side members 40 and end members 20 may then be laid flat upon each other for compact storage thereof. The above process may be repeated numerous times.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A portable chafing stand system, comprising:
   a pair of end members comprised of a first end member and a second end member, wherein each of said pair of end members include plurality of first slots and a plurality of second slots;
   a pair of side members comprised of a first side member and a second side member;
   wherein each of said pair of side members includes a first end and a second end in opposition to said first end, wherein said first end includes a plurality of first catch members, wherein said second end includes a plurality of second catch members;
   wherein said first catch members and said second catch members of said first side member are catchably received within said first slots of said first end member and said second end member;
   wherein said first catch members and said second catch members of said second side member are catchably received within said second slots of said first end member and said second end member; and
   wherein said side members each include a lower lip extending inwardly at an angle for selectively supporting a fuel unit, wherein a slot is formed between said lower lip of each said side members;
   wherein said first slots and said second slots are angled downwardly and inwardly.

2. The portable chafing stand system of claim 1, wherein said first slots are aligned with one another.

3. The portable chafing stand system of claim 1, wherein said second slots are aligned with one another.

4. The portable chafing stand system of claim 1, wherein said catch members each have a downwardly extending portion defining a receiving slot.

5. The portable chafing stand system of claim 1, wherein said end members each include at least one handle.

6. The portable chafing stand system of claim 5, wherein said end members each include an upper cutout above said handle.

7. The portable chafing stand system of claim 1, wherein said end members each include a lower cutout.

8. The portable chafing stand system of claim 1, wherein said end members each include an upper end edge that is capable of supporting an upper lip of a food tray.

9. The portable chafing stand system of claim 1, wherein said end members each include a plurality of upper supports extending substantially transversely there from.

10. The portable chafing stand system of claim 9, wherein said end members and said upper supports each include an upper end edge that is capable of supporting an upper lip of a food tray.

11. The portable chafing stand system of claim 1, wherein said end members each include at least one foot member.

12. The portable chafing stand system of claim 1, wherein said end members each have a substantially flat and straight structure.

13. The portable chafing stand system of claim 1, wherein said side members each include an upper side edge for supporting a floor of a food tray.

14. A portable chafing stand system, comprising:
   a pair of end members comprised of a first end member and a second end member, wherein each of said pair of end members include plurality of first slots and a plurality of second slots;
   a pair of side members comprised of a first side member and a second side member;
   wherein each of said pair of side members includes a first end and a second end in opposition to said first end, wherein said first end includes a plurality of first catch members, wherein said second end includes a plurality of second catch members;
   wherein said first catch members and said second catch members of said first side member are catchably received within said first slots of said first end member and said second end member;
   wherein said first catch members and said second catch members of said second side member are catchably received within said second slots of said first end member and said second end member;
   wherein said side members each include a lower lip extending inwardly at an angle for selectively supporting a fuel unit, wherein a slot is formed between said lower lip of each said side members;
   wherein said first slots and said second slots are angled downwardly and inwardly;
   wherein said first slots are aligned with one another;
   wherein said second slots are aligned with one another;
   wherein said catch members each have a downwardly extending portion defining a receiving slot;
   wherein said end members each include at least one handle;
   wherein said end members each include an upper cutout above said handle;
   wherein said end members each include a lower cutout;
   wherein said end members each include an upper end edge that is capable of supporting an upper lip of a food tray;
   wherein said end members each include a plurality of upper supports extending substantially transversely there from;
   wherein said upper supports each include an upper end edge that is capable of supporting an upper lip of a food tray;
   wherein said end members each include at least one foot member;

wherein said end members each have a substantially flat and straight structure; and wherein said side members each include an upper side edge for supporting a floor of a food tray.

15. A portable chafing stand system, comprising:

a pair of end members comprised of a first end member and a second end member, wherein each of said pair of end members include plurality of first slots and a plurality of second slots;

a pair of side members comprised of a first side member and a second side member;

wherein each of said pair of side members includes a first end and a second end in opposition to said first end, wherein said first end includes a plurality of first catch members, wherein said second end includes a plurality of second catch members;

wherein said first catch members and said second catch members of said first side member are catchably received within said first slots of said first end member and said second end member;

wherein said first catch members and said second catch members of said second side member are catchably received within said second slots of said first end member and said second end member; and wherein said side members each include a lower lip extending inwardly at an angle for selectively supporting a fuel unit, wherein a slot is formed between said lower lip of each said side members;

wherein said end members each include a plurality of upper supports extending substantially transversely there from.

16. The portable chafing stand system of claim 15, wherein said first slots are aligned with one another.

17. The portable chafing stand system of claim 15, wherein said second slots are aligned with one another.

18. The portable chafing stand system of claim 15, wherein said catch members each have a downwardly extending portion defining a receiving slot.

19. The portable chafing stand system of claim 15, wherein said end members each include at least one handle.

* * * * *